(«12») United States Patent
Meier et al.

(10) Patent No.: US 9,503,862 B2
(45) Date of Patent: Nov. 22, 2016

(54) METHOD FOR PROVIDING A SERVICE

(71) Applicants: Herbert Meier, Regensburg (DE); Ronald Hain, Oberasbach (DE)

(72) Inventors: Herbert Meier, Regensburg (DE); Ronald Hain, Oberasbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/800,260

(22) Filed: Jul. 15, 2015

(65) Prior Publication Data
US 2016/0021509 A1    Jan. 21, 2016

(30) Foreign Application Priority Data

Jul. 17, 2014  (DE) .................... 10 2014 213 984

(51) Int. Cl.
*H04W 4/02*  (2009.01)
*H04W 4/04*  (2009.01)
*H04W 4/22*  (2009.01)

(52) U.S. Cl.
CPC .............. *H04W 4/028* (2013.01); *H04W 4/04* (2013.01); *H04W 4/22* (2013.01)

(58) Field of Classification Search
CPC ......... H04W 4/02; H04W 4/04; H04W 4/22; H04W 4/028; B60W 2550/143; G01S 19/13; G06Q 30/0629; G06Q 30/0601; G06Q 30/0611; G06Q 30/0613; G06Q 50/22; G06F 19/3406
See application file for complete search history.

(56) References Cited

U.S. PATENT DOCUMENTS

| 7,627,414 | B2 | 12/2009 | Goto et al. |
| 8,447,804 | B2 | 5/2013 | Bai et al. |
| 2004/0230370 | A1 | 11/2004 | Tzamaloukas |
| 2014/0289074 | A1* | 9/2014 | White ................ G06Q 30/0629 705/26.41 |

FOREIGN PATENT DOCUMENTS

| DE | 10 2011 106 295 | 1/2012 |
| DE | 10 2011 120 965 | 4/2013 |
| DE | 10 2012 103 345 | 10/2013 |

* cited by examiner

*Primary Examiner* — Nizar Sivji
(74) *Attorney, Agent, or Firm* — Cozen O'Connor

(57) ABSTRACT

A method for providing a service provides for a service provider to provide information to a service demander. In order to produce the information, the service provider evaluates data that describe selected parameters along a journey route. The data from the selected parameters are obtained by the service provider from selected data providers for the purpose of evaluation. The data from the selected parameters are received by service provider from the selected data providers such that identification by the service provider of one of the data providers on the basis of the transmitted data is made more difficult.

10 Claims, 3 Drawing Sheets

METHOD FOR PROVIDING A SERVICE

BACKGROUND OF THE INVENTION

1. Field of the Invention

The invention relates to a method for providing a service, particularly a service for mobile users, for example for vehicles in a vehicle fleet.

2. Description of the Related Art

Cooperative services involve data being collected from many data providers or agents, which may be vehicles, for example, for the purpose of transmission to a service provider, for example a control computer (server) of a back-end system. The service provider evaluates the data and provides information from the service for a service demander or client, for example another vehicle. The information can also be distributed to a plurality of service demanders or clients. The service may be a traffic information service that provides queue information, car park information or other information of interest to a road user along a journey route. The data collected from the data providers for the service provider or the information provided by the service provider for the service demander can be transmitted via an air interface by means of a radio link.

Although the data transmitted by the data providers are not provided with an identification code that is directly associated with a data provider, for example a vehicle, it is entirely possible for correlation with the data provider to be set up by the geographical information that the data contain or by combining a plurality of data from the same data provider. An example of this is continuous data transmission along a journey route beginning at a home address of a driver to the workplace of the driver. A further example of data transmission that allows conclusions about the identity of a data provider, for example a vehicle and hence also the driver, is the recording of data from a vehicle that indicate a high speed of the vehicle and the momentarily later reception of data that indicate the activity of a braking system in the vehicle at a location at which an accident occurs approximately at the same instant. Potential consequences of the capability of drawing conclusions about the identity of a data provider by evaluating the received data may be not just mistrust of the use of information service in users but also legislative measures. These can include firstly the tightening of data protection laws and secondly the risk of demands on data storage.

SUMMARY OF THE INVENTION

An object of the present invention is to specify a method for providing a service in which the evaluation of data from data providers by a service provider allows the production of information that is made available to a service demander, with evaluation of the data preferably allowing no conclusions about the identity of the data providers.

According to one possible embodiment, the method provides for the provision of a service demander for requesting a piece of information from a service and of a multiplicity of data providers for providing data that each describe a parameter from a multiplicity of parameters along a journey route, wherein the journey route has a multiplicity of subsections. Furthermore, a service provider is provided for the purpose of providing the information, The service provider can produce the information from the service, and provide it for the service demander, by evaluating respective data that describe selected parameters from the multiplicity of the parameters along the journey route.

First of all, the service demander sends a request for the provision of the information from the service for the journey route to the service provider. The service provider selects the parameters to be evaluated that are necessary for providing the requested information from the multiplicity of possible parameters. Furthermore, the service provider selects a number of data providers for the respective provision of the data describing the parameters that are to be evaluated.

The respective data from the selected parameters are transmitted from the selected data providers to the service provider such that at least one of the selected data providers transmits data describing at least one selected parameter to the service provider only along a subsection of the journey route, wherein the subsection is shorter than the journey route, or the at least one data provider transmits respective data describing a first portion of the selected parameters to the service provider along the whole journey route and at least one further data provider transmits respective data describing a second portion of the selected parameters to the service provider along the whole journey route, wherein the first and second portions of the parameters each comprise fewer parameters than the whole of the selected parameters. The data respectively transmitted by the selected data providers to the service provider are evaluated by the service provider. The information from the service is provided for the service demander by the service provider on the basis of the evaluation of the data.

In order to produce information for a requested service, the method requires data from parameters, for example speeds or temperatures, to be recorded along a whole journey route and to be made available to the service provider for evaluation. The capability of drawing conclusions about the identity of the data provider, particularly a vehicle and hence the driver, from data recorded by a data provider exists, by way of example, when the data provider continuously transmits a multiplicity of data to the service provider between particular points on a journey route.

In accordance with the specified method, at least one of the data providers selected by the service provider transmits the data describing at least one of the selected parameters just on a subsection of the whole journey route. On a subsequent subsection, the data describing the at least one selected parameter are then transmitted from another of the selected data providers. This allows particular geographical regions, such as the region around the dwelling address of a driver or the region around his place of work, or generally a start and an end of a route, to be excluded from the data collection.

By way of example, a data provider delivers the data describing a selected parameter only up to a maximum distance of, by way of example, two kilometers in a total route of twenty kilometers. After this route section, no further data are transmitted from the data provider to the service provider for a particular distance, for example a distance of one kilometer. So that, despite the restricted data transmission from a data provider, the service provider nevertheless has sufficient data available that describe a parameter along a whole route, the provision of data describing a parameter is distributed over a plurality of data providers throughout the whole route, so that although the required data are available along the whole route they do not come exclusively from a single data provider.

If the provision of a piece of information requires the evaluation of data from various parameters along a whole route, a further capability may be to collect data that describe a first portion of the parameters required for providing the information from a first data provider along the whole route and to collect data that describe another parameter required for providing the information of a second data provider along the whole route. Such splitting of the provision of data over various data providers makes the combination of data combinations to produce a particular response, particularly an incorrect response, from a data provider much more difficult.

In the example mentioned above, data that indicate the speed of a vehicle along a journey route, for example, can be provided for the service provider by a first data provider, while data that indicate the operating state of a braking system in a vehicle along the route are provided by another vehicle.

Rules that specify how the individual data providers transmit the data they provide to the service provider can be stored with the service provider in a memory device. A further option is for the data providers also to have a memory device in which rules for data transmission are stipulated. This allows the forwarding of data to the service provider to be restricted directly at the respective data provider too. By way of example, appropriate definition of rules of the data provider makes it possible to stipulate which of the data that are existent with the data provider are transmitted to the service provider or whether data are transmitted to the service provider continuously along a journey route or whether data are transmitted only in sections along the journey route and no data transmission takes place between the individual sections. Depending on the chosen restriction, a data provider sometimes has fewer services available or the charges for a service are increased by the service provider for this data provider.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to figures that show exemplary embodiments of the present invention and in which.

DETAILED DESCRIPTION OF THE PRESENTLY PREFERRED EMBODIMENTS

Figure 1:
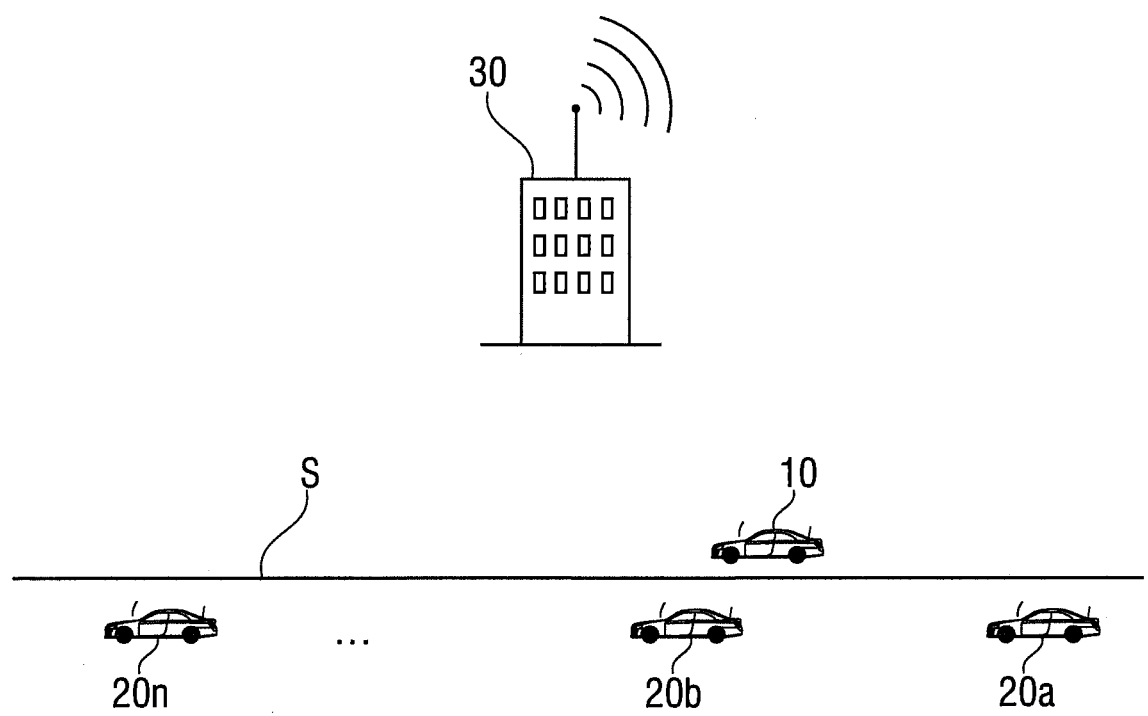
FIG. 1 shows an embodiment of a system for providing a service.

FIG. 1 shows a system for providing a service, with a service demander 10 for requesting a piece of information from the service, a multiplicity of data providers 20a, . . . , 20n for providing data that each describe a parameter from a multiplicity of parameters P1, . . . , Pn along a journey route S, and with a service provider 30 for evaluating the data respectively describing the parameters and for providing the information from the service. By way of example, the service demander 10 may be a vehicle, particularly a driver assistance system in a vehicle. The data providers 20a, . . . , 20n may be further vehicles that transmit data along the journey route S on which they are traveling to the service provider 30, said data being provided by respective data sources in the vehicles. By way of example, the service provider 30 may be a control computer (back-end server) that is located in a central unit and, following evaluation of the data delivered by the data providers 20a, . . . , 20n, generates the information from the service and makes this information available to the service demander 10.

Figure 2:
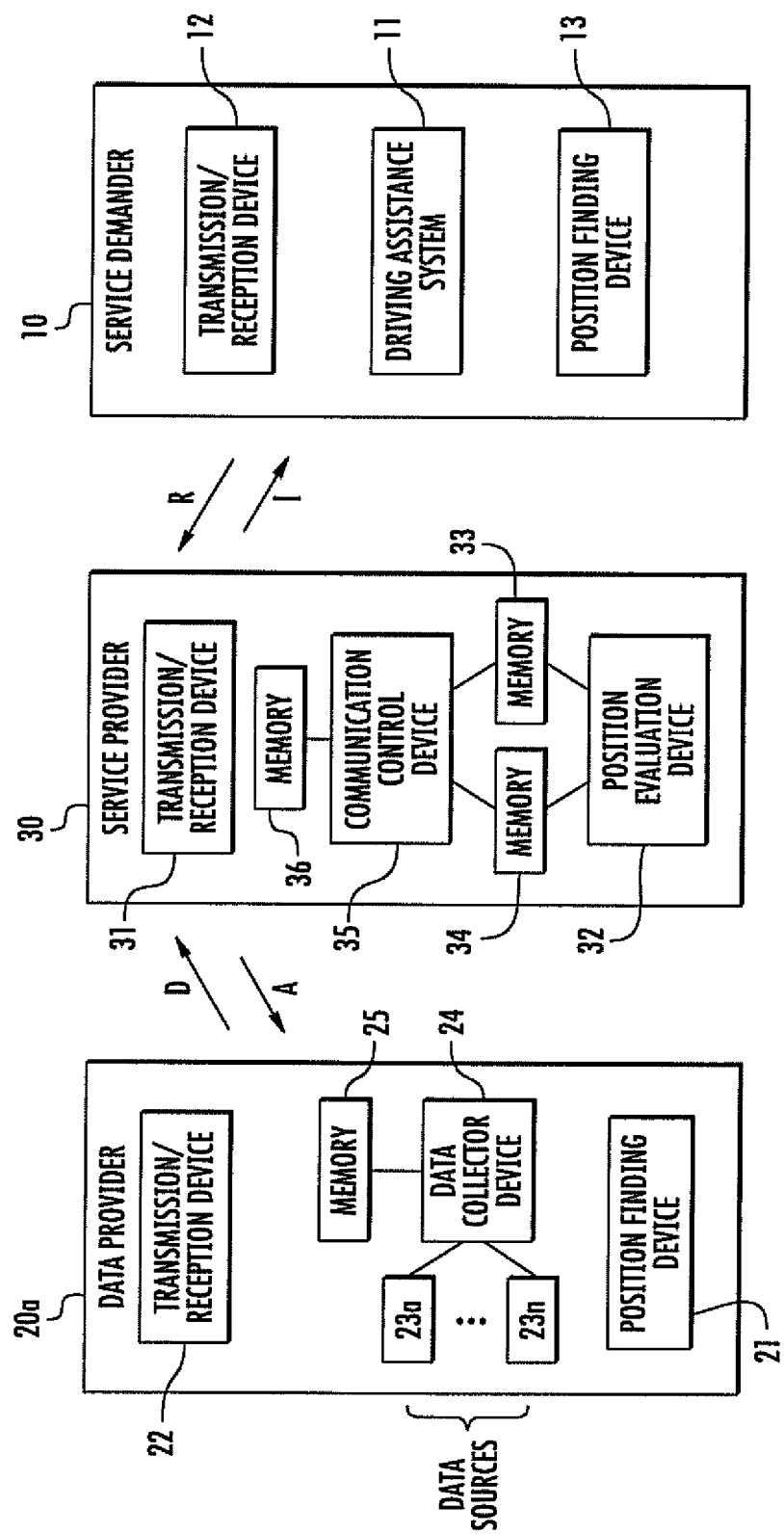
FIG. 2 shows an embodiment of a service demander, a data provider and a service provider.

FIG. 2 shows an embodiment of the service demander 10, of the data providers using the example of the data provider 20a and of the service provider 30. By way of example, the service demander 10 has a driving assistance system 11 for producing a request R for the provision of information I from a service. The request R is transmitted to the service provider 30 by a transmission/reception device 12. Furthermore, position parameters that are provided by a position finding device 13 of the service demander 10 are transmitted to the service provider 30 by the transmission/reception device 12.

The service provider 30 receives the request R from the service demander 10 by a transmission/reception device 31. A position evaluation device 32 of the service provider 30 evaluates the received position parameters from the service demander 10 and ascertains therefrom geographical coordinates for the service demander 10 at which the service demander is located at the moment of the request R, for example. The geographical coordinates of the service demander 10 can be stored in a memory device 33 of the service provider 30.

The data provider 20a has a position finding device 21 for ascertaining position parameters that indicate the current position of the data provider 20a. The position parameters are transmitted to the service provider 30 by a transmission/reception device 22 of the data provider 20a. The position evaluation device 32 of the service provider 30 evaluates the received position parameters from the data provider 20a and produces therefrom geographical coordinates for the data provider 20a that are stored in a memory device 34 of the service provider.

The service provider 30 has a communication control device 35 that, on the basis of the requested service, selects parameters that are to be evaluated from a multiplicity of possible parameters. For example, the communication control device 35 can select temperature measurements, windshield wiper status displays, precipitation measurements from rain sensors or light status displays from the data providers along the route S as parameters that need to be evaluated in order to produce the information I from the requested service. Furthermore, the communication control device 35 selects from the multiplicity of possible data providers 20a, . . . , 20n a particular number of data providers that need to provide the data describing the parameters that are to be evaluated along the journey route S.

By way of example, the communication control device 35 accomplishes this by comparing the geographical position of the service demander 10, which position is stored in the memory device 33, with the geographical coordinates of the data providers 20a, . . . , 20n that are stored in the memory device 34. In order to provide a service, for example a traffic flow information service along the journey route S, the communication control device 35 selects data providers 20a, . . . , 20n that are currently moving along the journey route S for the provision of data.

The data provider 20a has a multiplicity of data sources 23a, ..., 23n that may be in the form of sensors, for example. If the data provider 20a is a vehicle, the sensors can be used to sense the parameter of the average speed, the parameter of the outside temperature, the parameter of the windshield wiper status, the parameter of a sensed quantity of precipitation, a parameter that indicates the light status or a parameter that determines the road condition, for example, along the journey route S. The individual parameters are described by the data D that are collected by a respective data collector device 24 of the data providers from the measurements of the data sources 23a, ..., 23n.

The service provider 30 sends a request A for the provision of data that describe the selected parameters to the selected data providers. The selected data provider, in this case data provider 20a, then transmits the respective data D from the selected parameters to the service provider 30 such that the data describing the selected parameter are transmitted to the service provider only along a subsection of the whole journey route S, for example, wherein the subsection is shorter than the whole journey route S. On at least one subsequent subsection of the journey route S, the data from the same parameter are then transmitted from another of the selected data providers to the service provider 30. Hence, a particular data provider transmits the data describing the selected parameter only on a subsection of the whole route S.

According to a further embodiment, the data provider 20a transmits to the service provider 30 only data D that describe one portion of the parameters that are required for producing the information I. Data that describe another portion of the parameters that are required for generating the information I are transmitted along the journey route S from other data providers 20b, ..., 20n to the service provider 30. Hence, none of the data providers 20a, ..., 20n transmits the data that describe all of the parameters required for producing the information I along the whole journey route S.

The communication control device 35 is in a form such that despite the restricted data transmission by any individual data provider there is the assurance that the service provider 30 has sufficient data available from parameters, so that the requested information I from the service can be provided for a service demander 10.

The knowledge of what individual restrictions regarding forwarding of data from the data providers 20a, ..., 20n to the service provider 30 are affected may be stored directly with the respective data provider. This knowledge may be stored in a respective memory device 25 of the data providers in the form of rules that indicate how the selected data providers 20a, ..., 20n transmit the data from the selected parameters P1, ..., Pn to the service provider 30, or in the form of rules that indicate which selected parameters can be transmitted from the data providers 20a, ..., 20n to the service provider 30. Similarly, the service provider 30 can also have a memory device 36 that stores rules according to which the selected data providers can transmit the data describing the selected parameters to the service provider 30. The rules stored in the memory devices 25 and 36 therefore control which data from selected parameters are made available by the data providers for the service provider 30 for the purpose of evaluation in which periods or on which sections of a journey route.

The transmission of georeferences with the statements indicating which data from parameters or which subsets therefrom can be transmitted to the service provider 30 can be controlled by rules that are stored in the memory device 25 of a data provider. The rules for data transmission that are stored in the memory device 25 can be stipulated by a user, for example, particularly a driver. Ultimately, the memory devices 25 of the agents store the knowledge of which individual restrictions for the forwarding of data are affected.

In the memory device 36 of the service provider, on the other hand, fundamental rules of data transmission that are valid for all data providers are stipulated that make identification of a data provider more difficult or almost impossible. By way of example, the rules stored in the memory device 36 may contain a recommendation that particular measurements of parameters not be used by a data provider at the same time. So long as the required measurements can be taken without infringing the rule, this is avoided. If insufficient measurements are provided, however, it is also possible for a rule to be infringed so long as that rule is not an absolute requirement of the legislator.

By way of example, one of the rules stored in the memory devices 25 and 36 can indicate on which of the subsections of the journey route S a selected data provider needs to transmit the data D describing a selected parameter to the service provider 30. Furthermore, the memory devices 25 and 36 may store a rule that indicates which of the data made available by the data sources, particularly the sensors 23a, ..., 23n, are actually able to be transmitted to the service provider 30.

According to a further embodiment, the memory devices 25 and 36 may store which combinations of data from the selected parameters are able to be transmitted to the service provider 30 and which combinations of data from parameters permit a conclusion about the identity of the data provider through suitable analysis and hence are not able to be transmitted together from a single data provider to the service provider. The knowledge of which data combinations can be regarded as critical may be stored both with the agents 20a, ..., 20n and with the service provider 30.

According to a further embodiment, the memory devices 25 and 36 may store a rule that indicates in which geographical regions the data describing a selected parameter are able to be transmitted from a data provider 20a, ..., 20n to the service provider 30 and which geographical region is excluded from the data transmission. By way of example, a rule can indicate that the geographical region around the home address of a driver is excluded from the data transmission.

According to a further embodiment, the memory devices 25 and 36 may store a rule that specifies the maximum length of time for which the uninterrupted data transmission of data that describe a selected parameter from one of the data providers 20a, ..., 20n to the service provider 30 along the journey route S can last. Furthermore, the memory devices 25 and 36 may store a rule that specifies the length of time for which the minimum interruption in a data transmission along the journey route S must last.

The memory device 25 of the data providers may store a multiplicity of rules for the data transmission between a data provider and the service provider, each of the rules being able to be associated with one of a plurality of selectable safety levels. By way of example, a driver can then select one of the safety levels from the data provider. Depending on the rule associated with the selected safety level, the data describing the selected parameters P1, ..., Pn are transmitted from the at least one selected data provider 20a, ..., 20n to the service provider 30. In this embodiment, rules stored in the memory device 25 can therefore be stipulated by a driver by selecting a safety level.

By way of example, a driver can select between safety levels 0 to 3. If the driver selects safety level 0, for example, this means that for the data transmission to the service provider 30 it is merely ensured that minimum requirements that are stipulated by the legislator, for example, are observed. When a safety level 1 is selected, the data transmission is effected such that the data received by the service provider 30 do not permit any conclusion about the person of a data provider. If safety level 1 is selected, the data transmission is effected with consideration to rules that stipulate an interruption in the data transmission at particular intervals of time or prevent data that have been captured at a starting point or a destination of a journey route S from being transmitted to the service provider 30, for example. If safety level 2 is selected, for example, the sending of dynamics data that permit conclusions about a driving behavior is prevented. If safety level 3 is selected, no data transmission to the service provider 30 takes place at all.

Figure 3:
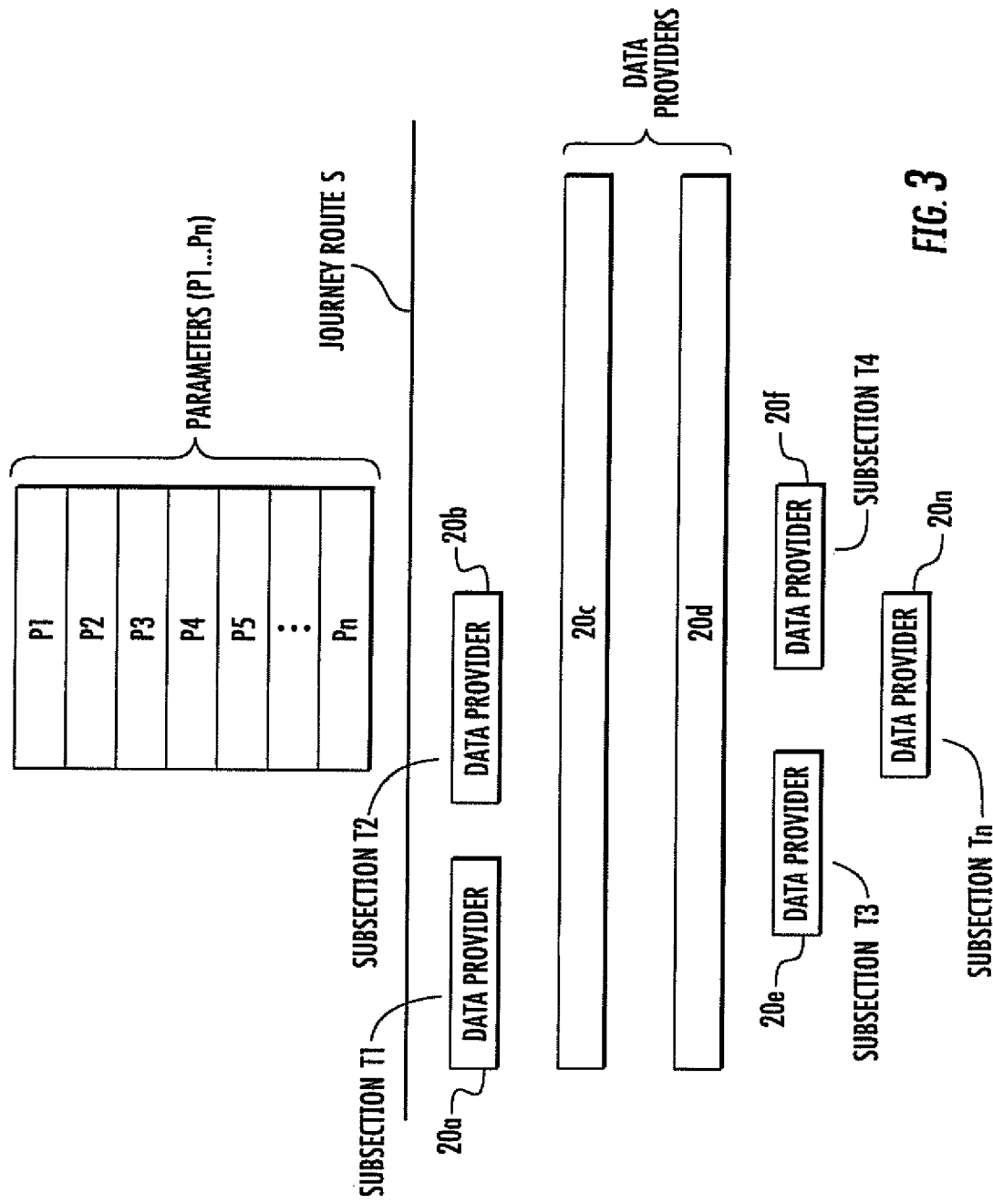
FIG. 3 shows an exemplary embodiment of a method for providing a service.

FIG. 3 is an example to illustrate the split of the provision of data describing various parameters P1, . . . , Pn over the data providers 20a, . . . , 20n selected along the journey route S. By way of example, the communication control device 35 uses the information requested by the service provider 10 for a service to ascertain that an average speed measurement from twenty data providers, a temperature measurement from five data providers, a windshield wiper status report, a rain sensor report, a light status report, a report about free areas and a road condition report from a total of ten data providers are required as parameters P1, . . . , Pn to be evaluated along the journey route S.

In accordance with the rules that the memory devices 25 and/or 36 contain, the data provider 20a transmits data from the parameters P1, P2, P3, P4 and P5 on a subsection T1 of the route S, for example. A further data provider 20b transmits measurement data from the parameters P1 and Pn on a later subsection T2, for example, a section of four kilometers. A further data provider 20c has made no limitations and therefore transmits the data from all of the parameters P1, . . . , Pn continuously along the whole journey route S to the service provider 30. Another data provider 20d transmits the parameters P2, P3, P4 and P5 continuously along the whole journey route S. The data provider 20e transmits data from all the parameters P1, . . . , Pn on a subsection T3 of three kilometers in length. A data provider 20f transmits the data from all of the ascertained parameters P1, . . . , Pn along a subsequent subsection T4 of the whole journey route S with a length of four kilometers. A data provider 20n transmits the parameters P1, . . . , Pn on a subsection Tn that covers a route section between subsections T3 and T4.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for providing a service by a service provider (30), comprising:
   receiving, by the service provider (30), a request from a service demander (10) for a piece of information (I) relating to a multiplicity of data providers (20a, . . . , 20n), the service demander (10) comprising a driving assistance system (11) in a vehicle operated by a driver;
   receiving, by the service provider (30), from the multiplicity of data providers (20a, . . . , 20n) data (D) that each describe a parameter (P1, . . . , Pn) from a multiplicity of parameters along a journey route (S), wherein the journey route has a multiplicity of subsections (T1, . . . , Tn);
   the service provider (30) generating the information (I) by evaluating respective data that describe selected parameters (P1, . . . , Pn) from the multiplicity of the parameters along the journey route (S);
   receiving, by the service provider (30), from the service demander (10), a request (R) for the provision of the information (I) from the service provider (30) for the journey route (S);
   selecting, by the service provider (30), parameters (P1, . . . , Pn) that are to be evaluated from the multiplicity of the parameters for providing the requested information (I) to the service demander (10);
   selecting, by the service provider (30), a number of data providers (20a, . . . , 20n) for the respective provision of the data (D) describing the parameters (P1, . . . , Pn) that are to be evaluated;
   receiving, by the service provider (30), from the selected data providers (20a, . . . , 20n), the respective data (D) from the selected parameters (P1, . . . , Pn) and receiving from at least one of the selected data providers (20a, . . . , 20n) data (D) describing at least one of the selected parameters (P1, . . . , Pn) along one of the subsections (T1, . . . , Tn) of the journey route (S), wherein the subsection (T1, . . . , Tn) is shorter than the journey route (S), or receiving from the at least one data provider (20a, . . . , 20n) respective data (D) describing a first portion of the parameters (P1, . . . , Pn) along the whole journey route (S) and receive from at least one further data provider (20a, . . . , 20n) respective data (D) describing a second portion of the parameters (P1, . . . , Pn) along the whole journey route (S), wherein the first and second portions of the parameters (P1, . . . , Pn) each comprise fewer parameters than the whole of the selected parameters (P1, . . . , Pn); and
   the service provider (30) evaluating the data (D) respectively received from the selected data providers (20a, . . . , 20n), and providing the information (I) to the service demander (10) on the basis of the evaluation of the data (D),
   wherein the information (I) from the service provider (30) is used by the driving assistance system (11) of the service demander (10) to provide driving assistance to the driver of the vehicle.

2. A method for providing a service by a service provider (30), comprising:
   receiving, by the service provider (30), a request from a service demander (10) for a piece of information (I) relating to a multiplicity of data providers (20a, . . . , 20n), the service demander (10) comprising a driving assistance system (11) in a vehicle operated by a driver;

receiving, by the service provider (30), from the multiplicity of data providers (20a, . . . , 20n) data (D) that each describe a parameter (P1, . . . , Pn) from a multiplicity of parameters along a journey route (S), wherein the journey route has a multiplicity of subsections (T1, . . . , Tn);

the service provider (30) generating the information (I) by evaluating respective data that describe selected parameters (P1, . . . , Pn) from the multiplicity of the parameters along the journey route (S);

receiving, by the service provider (30), from the service demander (10), a request (R) for the provision of the information (I) from the service provider (30) for the journey route (S);

selecting, by the service provider (30), parameters (P1, . . . , Pn) that are to be evaluated from the multiplicity of the parameters for providing the requested information (I) to the service demander (10);

selecting, by the service provider (30), a number of data providers (20a, . . . , 20n) for the respective provision of the data (D) describing the parameters (P1, . . . , Pn) that are to be evaluated;

receiving, by the service provider (30), from the selected data providers (20a, . . . , 20n), the respective data (D) from the selected parameters (P1, . . . , Pn) and receiving from at least one of the selected data providers (20a, . . . , 20n) data (D) describing at least one of the selected parameters (P1, . . . , Pn) along one of the subsections (T1, . . . , Tn) of the journey route (S), wherein the subsection (T1, . . . , Tn) is shorter than the journey route (S), or receiving from the at least one data provider (20a, . . . , 20n) respective data (D) describing a first portion of the parameters (P1, . . . , Pn) along the whole journey route (S) and receive from at least one further data provider (20a, . . . , 20n) respective data (D) describing a second portion of the parameters (P1, . . . , Pn) along the whole journey route (S), wherein the first and second portions of the parameters (P1, . . . , Pn) each comprise fewer parameters than the whole of the selected parameters (P1, . . . , Pn);

the service provider (30) evaluating the data (D) respectively received from the selected data providers (20a, . . . , 20n), and providing the information (I) to the service demander (10) on the basis of the evaluation of the data (D), wherein the information (I) from the service provider (30) is used by the driving assistance system (11) of the service demander (10) to provide driving assistance to the driver of the vehicle; and storing, in a memory of the service provider (30) and/or a memory of the data provider (20a, . . . , 20n) at least one rule, according to which the service provider (30) receives from the selected data providers (20a, . . . , 20n) the data (D) describing the selected parameters (P1, . . . , Pn).

3. The method as claimed in claim 2, wherein the at least one rule specifies on which of the subsections (T1, . . . , Tn) of the journey route (S) will the data (D) describing the at least one selected parameter (P1, . . . , Pn) received by the service provider (30) from the at least one selected data provider (20a, . . . , 20n) relate to.

4. The method as claimed in claim 2,
wherein the data (D) received from the data providers (20a, . . . , 20n) includes information relating to respective data sources (23a, . . . , 23n) describing the selected parameters (P1, . . . , Pn), and
wherein the at least one rule specifies which of the data (D) provided by the data sources (23a, . . . , 23n) of the at least one data provider (20a, . . . , 20n) will be received by the service provider (30) from the at least one data provider (20a, . . . , 20n).

5. The method as claimed in claim 2, wherein the at least one rule specifies which combinations of respective data (D) describing the selected parameters (P1, . . . , Pn) will be received by the service provider (30) from the at least one data provider (20a, . . . , 20n).

6. The method as claimed in claim 2, wherein the at least one rule specifies in which geographical regions the data (D) describing the at least one selected parameter (P1, . . . , Pn) will be received by the service provider (30) from the at least one data provider (20a, . . . , 20n) and which further geographical region is excluded from the data transmission.

7. The method as claimed in claim 2, wherein the at least one rule specifies a maximum length of time for which uninterrupted data transmission of the data (D) describing the at least one selected parameter (P1, . . . , Pn) from the at least one data provider (20a, . . . , 20n) to the service provider (30) along the journey route (S) lasts.

8. The method as claimed in claim 2, wherein the at least one rule specifies a length of time for which a minimum interruption in the data transmission of the data (D) describing the at least one selected parameter (P1, . . . , Pn) from the at least one data provider (20a, . . . , 20n) to the service provider (30) along the journey route (S) lasts.

9. The method as claimed in claim 2,
wherein each of the rules is associated with one of a plurality of selectable safety levels stored in a memory device (25) of the at least one selected data provider (20a, . . . , 20n), the method further comprising:
selection of one of the safety levels for the at least one selected data provider (20a, . . . , 20n); and
receiving, by the service provider (30), the data describing the selected parameters (P1, . . . , Pn) from the at least one selected data provider (20a, . . . , 20n) on the basis of the rule associated with the selected safety level.

10. The method as claimed in claim 1,
wherein the data providers (20a, . . . , 20n) are further vehicles that each have sensors (23a, . . . , 23n) for ascertaining the data (D) describing the parameters (P1, . . . , Pn).

* * * * *